(12) United States Patent
Oldroyd

(10) Patent No.: US 6,738,532 B1
(45) Date of Patent: May 18, 2004

(54) IMAGE REGISTRATION USING REDUCED RESOLUTION TRANSFORM SPACE

(75) Inventor: Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 568 days.

(21) Appl. No.: 09/651,522

(22) Filed: Aug. 30, 2000

(51) Int. Cl.$^7$ .................................................. G06K 9/32
(52) U.S. Cl. ...................... 382/294; 382/284; 382/289; 345/634
(58) Field of Search ................................. 382/294, 289, 382/295, 293, 284; 348/95; 250/491.1; 345/634

(56) References Cited

U.S. PATENT DOCUMENTS

| | | | | |
|---|---|---|---|---|
| 4,635,293 A | * | 1/1987 | Watanabe | 382/294 |
| 5,495,535 A | * | 2/1996 | Smilansky et al. | 382/294 |
| 5,550,937 A | * | 8/1996 | Bell et al. | 382/294 |
| 5,611,000 A | * | 3/1997 | Szeliski et al. | 382/294 |
| 5,649,032 A | * | 7/1997 | Burt et al. | 382/294 |
| 6,097,854 A | * | 8/2000 | Szeliski et al. | 382/284 |
| 6,178,271 B1 | * | 1/2001 | Maas, III | 382/294 |
| 6,266,452 B1 | * | 7/2001 | McGuire | 382/294 |
| 6,577,744 B1 | * | 6/2003 | Braudaway et al. | 382/294 |

* cited by examiner

*Primary Examiner*—Amelia M. Au
*Assistant Examiner*—Colin LaRose
(74) *Attorney, Agent, or Firm*—Harness Dickey & Pierce P.L.C.

(57) ABSTRACT

A method of registering images is provided which includes capturing a first original image of a scene under surveillance, capturing a second original image of the scene under surveillance, coarsely matching the first original image to the second original image to give approximate angle and offset parameters of the first original image to the second original image, and finely matching the first original image to the second original image based on the approximate angle and offset parameters of the coarsely matching step. The coarsely matching step involves applying a plurality of rotations to a reduced version of the first original image to form a rotated and reduced first original image and performing a correlation match between the rotated and reduced first original image and a reduced version of the second original image. The finely matching step employs control point matching between the first original image and the second original image using small image patches at a scale of the one of the first original image and the second original image having lower resolution.

33 Claims, 3 Drawing Sheets

IMAGE REGISTRATION USING REDUCED RESOLUTION TRANSFORM SPACE

TECHNICAL FIELD

The present invention generally relates to image registration and, more particularly, to image registration using a two stage registration process.

DISCUSSION

Two different images of a common scene are often obtained so that different categories of information within the scene can be captured. For instance, the images may represent reflectances in different spectra, such as a first image in the visible wavelengths and the other image in the infrared wavelengths. One image may be a synthetic image, such as from synthetic aperture radar, and the other image may be an electro-optical image, such as from a visible or infrared system. On the other hand, both images may be synthetic, such as from a synthetic aperture radar and a digital graphic map.

To understand the images captured, image registration is required. Image registration involves the computation of a mathematical transformation which maps or transforms pixel coordinates of one image into the associated pixel coordinates of the other image. Digital images often need to be registered so that pixels associated with specific locations in one image can be associated with pixels of exactly the same locations in a second image.

Image registration can be quite difficult because of the number of degrees of freedom involved in the registration process. The parameters involved include translation in two dimensions, rotation around a point in the image plane, and perspective of the scene from the viewpoint (which involves the relative displacement between the observation point and the central point of view, the orientation of the imaging device at that point, and the imaging characteristics of the imaging device, such as focal length, etc.).

In order to reduce image registration difficulty, registration is typically performed between images that have the same viewing geometry of the same scene. In this way, the images have large differences in only two parameters, that is, translation in the coordinate axes of the images, e.g., X and Y. Although other parameters may vary, those differences constrain the applicability and usability of the registration process by introducing error that can defeat or mislead the registration operation.

Numerous techniques, primarily based on statistical correlation or information measures, have been developed and improved to solve offset differences with optimal performance. Such techniques affect a rapid and efficient search through the range of possible offsets and generate a "goodness of fit" measure at each hypothesized offset. The location offering the best fit is taken to derive the offset mapping.

On the other hand, relative rotation between images is extremely expensive to compute. Techniques comparable to correlation or information measures have not yet been developed to rapidly and efficiently search through the space of possible rotations. In addition, rotational registration couples with the offset since rotation of one image is seen as being around some point in its plane. As a result, searching is typically done using a brute force technique. For example, one image is rotated, then a rapid offset registration process is performed, and the sequence is repeated until a best goodness of fit measure is obtained. The rotation at which that best fit is obtained is then taken to indicate the relative rotation between the images.

Although many approaches have been employed to improve rotational registration, they all suffer from certain deficiencies. Such deficiencies include multiple reduced resolution stages which require extra processing, rotational matching impracticality due to computational requirements, unsuitability due to expensive Fourier methods, and lack of quality assurance to evaluate the registration mapping. In view of the foregoing, an improved registration process is needed.

SUMMARY OF THE INVENTION

In view of the foregoing, it is in object of the present invention to provide a two-stage process with a reduced resolution stage first serving to give approximate parameters that are refined in a subsequent stage in a computationally efficient manner.

It is another object of the present invention to use a reduced resolution stage so that brute force matching over a range of rotational differences can be effectively applied.

It is yet another object of the present invention to obtain both angle and offset approximations during the reduced resolution stage to make the subsequent stage more efficient.

It is still yet another object of the present invention to register images of vastly different resolutions.

It is another object of the present invention to use small patch registration in a partially registered image to make control point matching more efficient.

It is yet another object of the present invention to use patch location adjustment to make control point matching more robust.

It is still yet another object of the present invention to use patch layout and patch matching evaluation to measure control point match quality.

It is another object of the present invention to use geometric figure mapping from a fiducial image space to the registered image space to determine registration quality.

With the foregoing objects in mind, the present invention includes capturing a first original image of a scene under surveillance, capturing a second original image of the scene under surveillance, coarsely matching the first original image to the second original image to give approximate angle and offset parameters of the first original image to the second original image, and finely matching the first original image to the second original image based on the approximate angle and offset parameters of the coarsely matching step. The coarsely matching step involves applying a plurality of rotations to a reduced version of the first original image to form a rotated and reduced first original image and performing a correlation match between the rotated and reduced first original image and a reduced version of the second original image. The finely matching step employs control point matching between the first original and the second original image using small image patches at the scale of the lower resolution of the two images.

During coarse matching, the reduced first original image is rotated by a sequence of angle increments that in combination encompass a range of possible rotational mismatches between the first original image and the second original image. The rotated and reduced first original image and the reduced second original image are transformed into the Fourier domain by subjecting each to a Fourier transform to produce Fourier images including an array of spatial frequency coefficients. A complex conjugate transform is then applied to one of the Fourier images. Thereafter, the Fourier images are correlated by pixel multiplication in the Fourier domain to yield a product image.

An inverse Fourier transform is applied to the product image to yield a correlation image having pixel values representing correlation coefficients corresponding to offsets given by row and column coordinates of a correlation coefficient pixel. A peak correlation coefficient is determined for the correlation image by examining all the correlation coefficients and identifying the largest one, and its location by row and column offset in the correlation image. A set of peak correlation coefficients is collected, one for each different rotation of the rotated and reduced first original image, along with a correlation peak-to-side-lobe (PSR) value, correlation histogram, and the peak location. A rotational difference is then identified between the first and second original images by examining the set of peak correlation coefficients for a maximum correlation coefficient. The PSR and correlation histogram are evaluated to determine if the maximum peak is of sufficient quality to proceed. If it is not, a secondary peak having the best PSR and correlation histogram is selected as the maximum peak. An approximate shift offset is identified between the first and second original images by determining row and column offsets of the maximum peak correlation coefficient corresponding to the rotational difference.

To prepare the images for fine matching, the first original image is reduced to form a second reduced first original image having a common scenic scale as the second original image so that scenic objects appearing in both images have a common extent. The second reduced first original image is then rotated by the rotational difference to form a second rotated and reduced first original image.

The finely matching step involves selecting a plurality of first offset patch images from the second rotated and reduced first original image from a grid of pre-selected locations uniformly and symmetrically spread around an extent of the second rotated and reduced first original image as modified by shifting according to the row and column offsets. Each first offset image patch is then checked to ensure that each first offset image patch falls completely within the extent of the second rotated and reduced first original image. Next, a plurality of second image patches are selected from a grid of pre-selected locations uniformly and symmetrically spread around an extent of the second original image.

The first offset image patches are then matched with the second offset image patches by correlation such that each pair of corresponding patches produces one correlation image that is used to produce one control point for image registration. The peak correlation value in each correlation image is identified during correlation. The location of the peak correlation value gives the precise offset between the match point in the second original image and a corresponding match point in the second reduced and rotated first original image.

The precise offset determined during the correlation step and the row and column offset determined in the coarsely matching step are then added to the location of the second offset image patch from the second original image to produce a measured location equivalent to a point in the second reduced and rotated first original image that corresponds with the match point in the second original image.

Next, the measured location is de-rotated by applying the reverse of the rotation that was applied to the second reduced first original image and re-scaled by applying the reverse of the second reduction that was applied to the first original image to yield a correct control point location in the first original image that matches a corresponding control point in the second original image. The set of all control point pairs gives a control set which is used to obtain a mathematical transformation that provides registration mapping between the first and second original images. The control set is a set of pairs of corresponding measured and fiducial points in the first and second original images that define which points in the images coincide.

Registration mapping involves a pair of mathematical functions that map coordinate locations in the first original image into the corresponding locations in the second original image. A statistical adjustment is used to produce a set of parameters that specify the mathematical functions.

According to another aspect of the present invention, a measure of remaining distance errors is determined between control point pairs after registration mapping to indicate an accuracy of the registration mapping of the control point pairs in the control set. The errors are then inspected to determine if the registration mapping produces excessive error. Preferably, the inspecting step includes computing a sequence of point coordinates corresponding to a geometric shape in the second original image, transforming the sequence of point coordinates using the registration mapping into point coordinates in the first original image, and evaluating the transformed points to determine a closeness of fit of the sequence of point coordinates relative to the geometric shape in the second original image.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards an automatic image registration process. The process employs two stages of processing including a reduced resolution first stage serving to give approximate parameters that are refined in the second stage. Advantageously, the use of a reduced resolution stage enables brute force matching to be effectively applied over a range of rotational differences. Further, since both angle and offset approximations are obtained during the reduced resolution first stage, the subsequent stage processing is more efficient.

Figure 1:
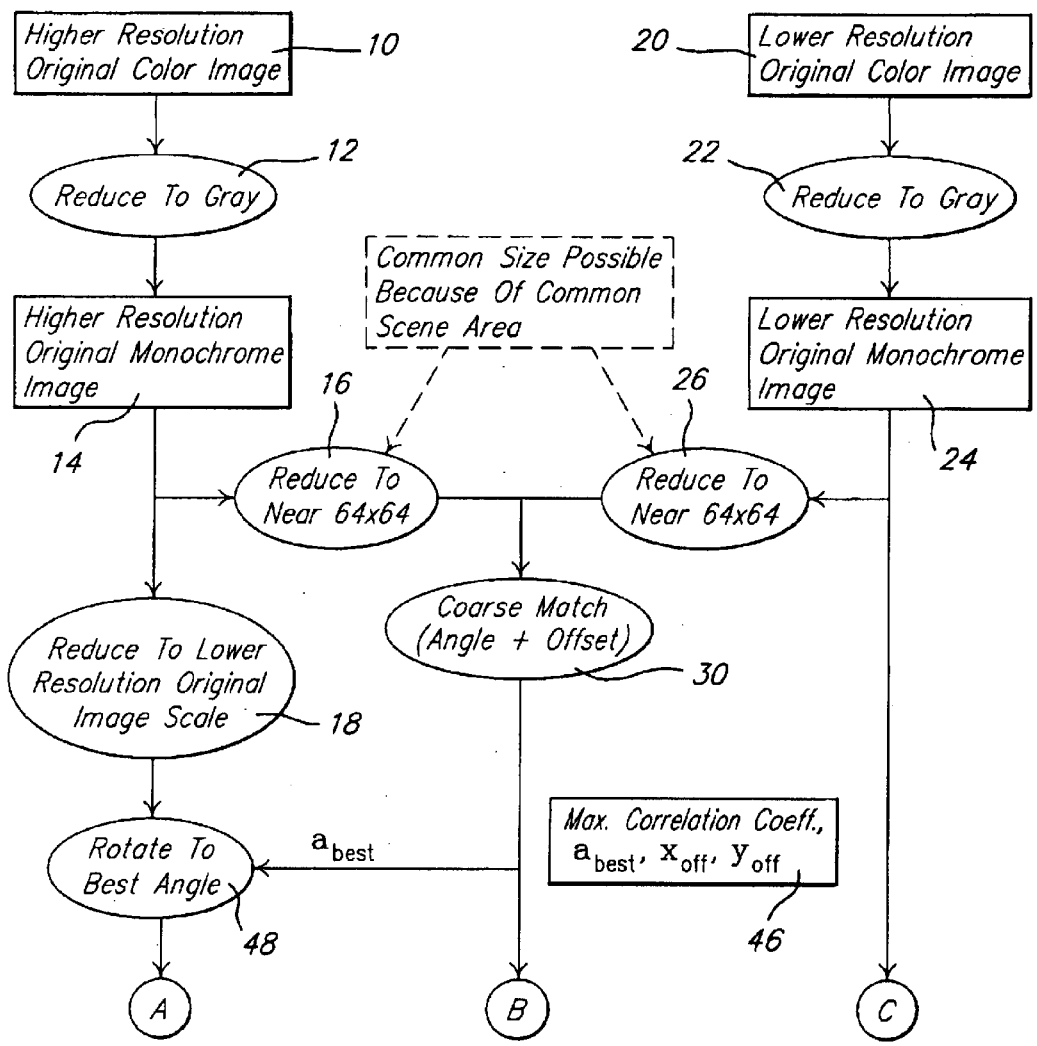
FIG. 1 is a flow chart illustrating an automatic image registration process in accordance with the teachings of the present invention.

Turning now to the drawing figures, FIG. 1 illustrates a flow chart depicting the automatic image registration process of the present invention. The methodology begins in block 10 by obtaining a first original image of the scene under surveillance. For example, the original image captured at block 10 may be a high resolution color image. From block 10, the methodology advances to block 12.

In block 12, the methodology converts the original image obtained at block 10 to a single gray monochrome color. The step in block 12 assumes that the first original image was a color image. To change the original image from block 10 to a monochrome image at block 12, the methodology may select one band, for example, the green band from a color image represented by red, green, and blue bands. This may also be done by computing a monochrome intensity value for each pixel. This can be done using a computation that combines the red, green, and blue values of a pixel according to a formula such as:

$$Grey=0.299*Red+0.587*Green+0.114*Blue.$$

After obtaining the single gray monochrome image at block 12, the methodology continues to block 14. In block 14, the higher resolution original monochrome image is obtained from block 12. From block 14, the methodology advances to block 16 and block 18.

In block 16, the higher resolution original monochrome image from block 14 is reduced to a pre-selected scale. The size of the scale is selected so that objects in the two reduced images (one from block 10 et seq. and one from block 20 et seq.) will have this same apparent size, as measured in pixels, in both images.

Referring now to block 20, simultaneously with the acquisition of the first original image at block 10, the methodology also acquires a second original image of the scene under surveillance at block 20. For example, the second original image may be a lower resolution original color image. After obtaining the second original image at block 20, the methodology advances to block 22.

In block 22, the methodology converts the original image from block 20 to a single gray monochrome color. In this step, it is assumed that the second original image obtained at block 20 was a color image. As in block 12, the methodology may convert the color image to a gray image by selecting one band, for example the green band from a color image represented by a red, green, and blue bands. Alternatively, this may be done by computing a monochrome intensity value for each pixel using a computation that combines the red, green, and blue values of a pixel according to a known formula such as that described above.

Figure 3:
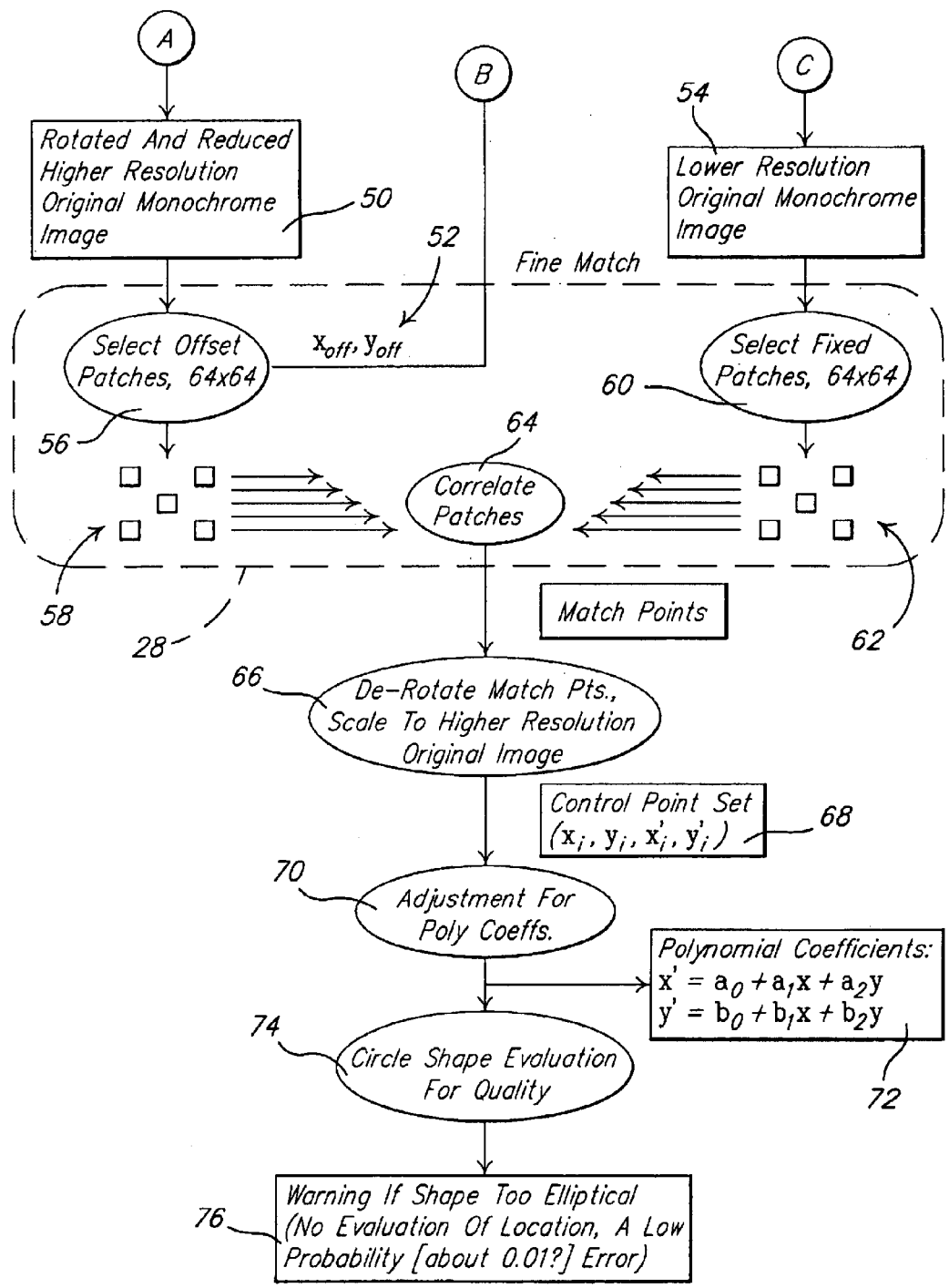
FIG. 3 is a continuation of the automatic image registration process of FIG. 1.

From block 22, the methodology advances to block 24. In block 24, the methodology acquires the lower resolution original monochrome image from block 22. From block 24, the methodology advances to block 26 and block 28 (FIG. 3).

In block 26, the methodology reduces the lower resolution original monochrome image from block 24 to a pre-selected scale which is common to the scale used in block 16. The size of the lower resolution original image is reduced to approximately, and preferably no smaller than, 64 by 64 pixels. The common scale insures that objects in the reduced image at block 16 and the reduced image in block 26 have the same apparent size, as measured in pixels, in both images. From blocks 16 and 26, the methodology advances to block 30 where a first stage coarse match between the images is obtained.

Figure 2:
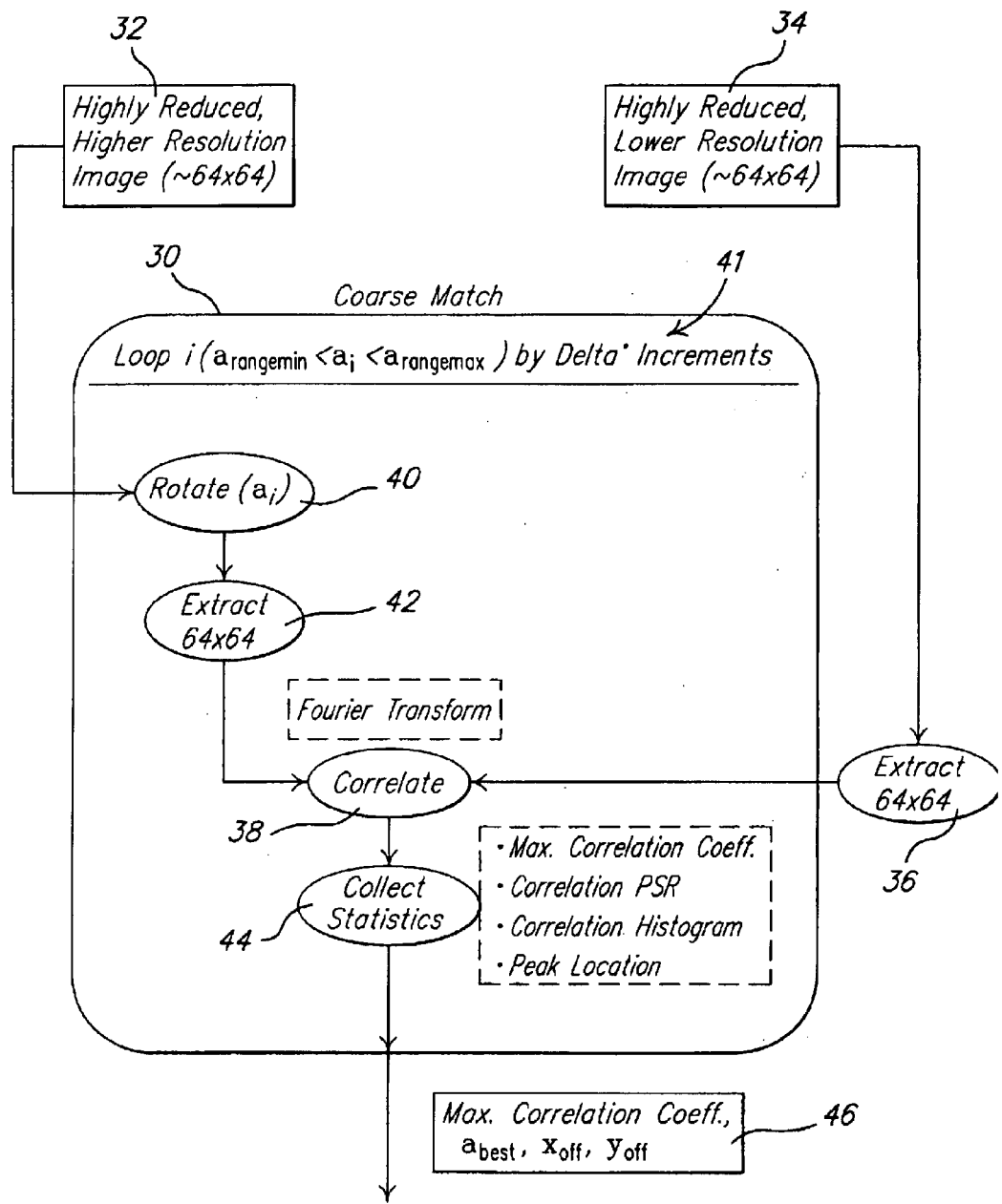
FIG. 2 is a flow chart illustrating a portion of the automated image registration process of FIG. 1 in greater detail.

Referring now to FIG. 2, the first stage course match processing block 30 of FIG. 1 is illustrated in greater detail. The coarse match registration process starts with the highly reduced higher resolution image at block 32 which is produced by the reduction step in block 16 of FIG. 1 and the highly reduced lower resolution image 34 which is produced by the reduction step in block 26 of FIG. 1.

In block 36, the highly reduced lower resolution image 34 is trimmed to be, preferably, 64 by 64 pixels. It is assumed that the original images (from blocks 10 and 20) portray approximately the same scenic area so that trimming of the reduced versions of the images will leave a substantial amount of common scenic content to the two trimmed images. The selection of a 64 by 64 pixel size is determined by the scenic content and by the need to have a size that is a power of two in each dimension.

If the scenic content has distinct patterns over larger areas, it may be possible to use a common size that is 32×32 pixels or smaller. If there is little large area scenic detail, it may be necessary to use a larger common size at the cost of reduced processing speed. After extracting the 64 by 64 pixels at block 36, the methodology advances to block 38 which is described in greater detail below.

Referring again to the highly reduced higher resolution image 32, in block 40 a plurality of rotations are applied to the highly reduced higher resolution image 32. This can be accomplished using a sequence of known image rotation methods, using a smooth value interpolation process such as bi-linear interpolation to produce values for rotated pixels that do not come from exact integer coordinate locations in the image being rotated. Parts of the rotated image that come from outside the boundaries of the image being rotated are set to zero.

Preferably, the rotations are performed using a sequence of angle increments, generally shown at 41, that in combination encompass the range of possible rotational mismatches between the highly reduced higher resolution image 32 and highly reduced lower resolution image 34. The rotations applied in sequence increase from the minimum of the range, with a fineness of rotational step sufficient to ensure later matching success. Later matching success can usually be obtained if the rotation is known to within about plus or minus 2 degrees or less. A sequence of rotations with two degree steps has proven adequate in an example implementation.

From block 40, the methodology continues to block 42. In block 42, the rotated, reduced higher resolution image is trimmed to be 64 by 64 pixels as determined by scenic content as described above with respect to block 36. From block 42, the methodology continues to block 38.

In block 38, a correlation match is performed between the extracted portion of the rotated, reduced higher resolution image from block 42 and the extracted portion of the reduced lower resolution image from block 36. To accomplish this, both images are first transformed into the Fourier domain by subjecting them to a Fourier transform to produce an image or array of complex values or spatial frequency coefficients. A complex conjugate transform is then applied to one of the Fourier images. Correlation is then performed by pixel multiplication in the Fourier domain according to known practice to yield a product image. This correlation method is very efficient and feasible due to the spatial reduction and Fourier transform applied to the images.

Next, the inverse Fourier transform is applied to the product image to yield a correlation image with pixel values representing correlation coefficients corresponding to offsets given by the row and column coordinates of the correlation coefficient pixel. In block 44, the correlation image is scanned for the maximum pixel value and other statistical values, such as correlation PSR, correlation histogram, and peak location, which are derived from the correlation image.

The row and column location of the peak correlation coefficient value identifies the relative shift in pixels between the rotated reduced image from block 42 and the other reduced image from block 36 for best approximate match. The value of the peak correlation coefficient value is proportional to the strength or quality of the correlation at that offset. Larger coefficient values indicate better matches between the two images.

From block 44, the methodology advances to block 46. In block 46, the set of peak correlation coefficients obtained from processing the plurality of rotations in block 44 is examined for the maximum of all the peaks. The rotation $a_{best}$ that produces the maximum of the maximum correlation values is taken to indicate the rotational difference between the two original images.

The row and column offsets $X_{off}$, $y_{off}$ corresponding to that same rotation are taken to indicate the approximate shift offset between the two original images, assuming the rotational difference has been removed. The offsets are then re-scaled in size, according to the reductions originally applied to produce the reduced images. Through this means, an approximate relationship between the two original images is obtained. This approximate relationship is critical to being able to reduce the amount of computation needed to achieve the fine registration match described below, as they allow small patches to be used to find match points between the two images.

Referring again to FIG. 1, from block 46, the methodology advances to block 48 and block 28 (FIG. 3). In block 48, the methodology employs the best rotation to rotate the image from block 18. Referring again to block 18, to prepare for fine resolution matching, the higher resolution original monochrome image from block 14 is reduced at block 18 to have the same scenic scale as the lower resolution original monochrome image in block 24. That is, the higher resolution image from block 14 is reduced in scale so that scenic objects appearing in both images will have the same extent when measured in pixel units. This removes the scale difference between the two images.

From block 18, the methodology advances to block 48. In block 48, the reduced higher resolution image from block 18 is rotated by an amount given by the angle $a_{best}$ determined in the coarse resolution processing 30 of FIG. 2 and provided by block 46. Such rotation approximately removes the rotational differences between the two images. This step is vital to limit the search area for finding matching points between the two images, and to ensure successful correlation of patches. From block 48, the methodology advances to block 28 of FIG. 3.

Referring now to FIG. 3, the second stage fine match processing sequence of the present invention will be described. The fine match sequence, which is generally indicated at 28, starts with the rotated and reduced higher resolution original monochrome image 50 from block 48 of FIG. 1, the row and column offsets $X_{off}$, $y_{off}$ 52 from block 46 of FIG. 1, and the lower resolution original monochrome image 52 from block 24 of FIG. 1.

In block 56 of the fine match process 28, the methodology selects a plurality of offset patch images 58 from the rotated and reduced higher resolution original monochrome image 50. The patches 58 from the rotated, reduced higher resolution original image 50 are taken from a grid of known locations as modified by shifting to allow for the approximately determined offset 52 between the two images.

Each patch 58 taken is checked to ensure that it falls completely within the extent of the rotated, reduced, higher resolution original image 50. If a patch 58 is found to fall outside the extent, the location of the patch is adjusted so that it falls just within the extent. In this case, the corresponding patch (to be described) from the lower resolution original image 54 is also moved. In this way, a new patch is taken from the lower resolution original image 54 at a location that is the original location of that patch, modified by the adjustment needed for the patch in the reduced rotated higher resolution image 50. If the newly selected patch 58 also suffers a conflict, both patches are then re-selected so that both fall outside of their respective image extent by approximately the same, minimal amount.

In block 60 of the fine match processing 28, the methodology selects a plurality of patch images 62 from the lower resolution original monochrome image 54. Each patch 62 is a small 64 by 64 pixel portion of the image 54. The patches 62 are taken from a grid of known locations which are uniformly and symmetrically spread around the extent of the lower resolution original image 54. Each patch 62 is taken entirely from within the extent of the lower resolution original image 54.

In block 64, the two sets of corresponding patches 58 and 62 are matched by correlation. Each pair of corresponding patches produces one correlation image that is used to produce one control point for the image registration. Correlation using the Fourier transform is reasonably efficient, given the size of the patches 58 and 62.

During correlation, the peak correlation value is located in each correlation image. The location of the peak correlation value gives the precise offset between the match point in the lower resolution original image 54 and its corresponding match point in the reduced rotated larger higher resolution image 50, for the patch that was correlated.

The offset determined by the correlation at block 64 and the offset 52 determined in the coarse match process 30 (FIG. 2) are then added to the known location of the patch from the lower resolution original image 54 to produce a measured location. The measured location is the location of the point in the reduced rotated higher resolution image 50 that corresponds with the match point in the lower resolution original image 54.

In block 66, the measured location is de-rotated by applying the reverse of the rotation that was applied in block 48 of FIG. 1 to produce the reduced rotated higher resolution original image 50, and re-scaled by applying the inverse of the scaling used in block 18 to produce the reduced rotated high resolution original image 50. The resulting location is the correct control point location in the higher resolution original monochrome image from block 14 of FIG. 1 that matches the corresponding control point in the lower resolution original image 54. The set of all such control point pairs gives a control set 68 which is used to obtain a mathematical transformation or warp that provides the registration between the two original images.

The registration mapping involves a pair of mathematical functions, f(x,y) and g(x,y) that map coordinate locations x, y in one image into the corresponding locations x',y' in the other image, using x'=f(x,y) and y'=g(x,y). The control set 68 is a set of pairs of corresponding measured and fiducial points in the two images that define which points in the two images should coincide.

In block 70 a known statistical adjustment is used to produce a set of parameters that specify the functions f(x,y) and g(x,y). The form of the function f(x,y) and g(x,y) may be as simple as a low order polynomial, as in block 72, and usually limited to the third order, or more complex such as a rational polynomial P(x,y)/Q(x,y), where each of P(x,y) and Q(x,y) are low order polynomials, usually limited to the third order. More complex functional forms may be used, depending on the size of the control set 68 and the need for more complex models for the distortion error between the images.

One result of the above adjustment process is a measure of residuals that indicates how accurately the registration mapping transforms the points in the control set 68. The residuals are remaining distance errors between the corresponding points after the registration mapping is applied. The error is often expressed in pixel units. Preferably, errors are inspected to determine if the mapping produces excessive error.

For example, in block 74 a method is provided to test the accuracy of the registration by mapping a circle or other pure geometric shape to the registered image. In this method, a computing process computes a sequence of point coordinates corresponding to an exact circle or other geometric shape in the lower resolution original image coordinates. These point coordinates are then transformed using the registration mapping into point coordinates in the higher resolution original image coordinates. The transformed points are then evaluated to see how closely they fall on a circle or other geometric shape using a known measure of circularity or shape. If the circularity or shape measure is not sufficiently satisfied, the methodology advances to block 76 and issues a warning concerning potential invalidity of the registration.

Thus, the present invention provides a two step process for registering two different types of images of a common scene. In the first step a coarse match method is used to give approximate parameters in a computationally efficient manner. In the second step, small patch registration is used in a partially registered image to make control point matching more efficient. Finally, geometric mapping from a fiducial image space is used to determine registration quality.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of registering images comprising:
   capturing a first original image of a scene under surveillance;
   capturing a second original image of said scene under surveillance;
   coarsely matching said first original image to said second original image to give approximate angle and offset parameters of said first original image to said second original image;
   finely matching said first original image to said second original image based on the approximate angle and offset parameters of said coarsely matching step;
   reducing said first original image to form a second reduced first original image having a common scenic scale as said second original image so that scenic objects appearing in both images have a common extent; and
   rotating the second reduced first original image by a rotational difference between the first and second original images to form a second rotated and reduced first original image;
   wherein the finely matching step further comprises selecting a plurality of first offset patch images from the second rotated and reduced first original image from a grid of pre-selected locations uniformly and symmetrically spread around an extent of the second rotated and reduced first original image.

2. The method of claim 1 further comprising reducing said first and second original images to a pre-selected scale to form a reduced first original image and a reduced second original image having a common apparent size.

3. The method of claim 2 wherein said coarsely matching step further comprises:
   applying a plurality of rotations to the reduced first original image to form a rotated and reduced first original image; and
   performing a correlation match between the rotated and reduced first original image and the reduced second original image.

4. The method of claim 3 wherein said applying step further comprises rotating said reduced first original image by a sequence of angle increments that in combination encompass a range of possible rotational mismatches between the first original image and the second original image wherein sequential rotations increase from a minimum of the range by a pre-selected rotational increment.

5. The method of claim 4 wherein said pre-selected rotational increment further comprises two degree increments or less.

6. The method of claim 3 wherein said correlation match further comprises:
   transforming said rotated and reduced first original image and said reduced second original image into a Fourier domain by subjecting each to a Fourier transform to produce Fourier images including an array of spatial frequency coefficients;
   applying a complex conjugate transform to one of the Fourier images; and correlating the Fourier images by pixel multiplication in the Fourier domain to yield a product image.

7. The method of claim 6 further comprising:
   applying an inverse Fourier transform to the product image to yield a correlation image having pixel values representing correlation coefficients corresponding to offsets given by row and column coordinates of a correlation coefficient pixel.

8. The method of claim 7 further comprising:
   creating a set of peak correlation coefficients by collecting peak values from scanning each correlation image for a maximum pixel value.

9. The method of claim 8 wherein:
   the rotational difference between the first and second original images is identified by examining the set of peak correlation coefficients for a maximum correlation coefficient.

10. The method of claim 9 wherein:
    prior to said selecting step, said second rotated and reduced first original image is shifted by identifying an approximate shift offset between the first and second original images by determining row and column offsets corresponding to the rotational difference.

11. The method of claim 10 further comprising re-scaling said row and column offsets in size according to any reductions applied during said step of reducing said first and second original images.

12. The method of claim 2 wherein said pre-selected scale is selected to provide images that are small enough to enable brute force matching.

13. The method of claim 12 Wherein said images are less than or equal to 64 by 64 pixels.

14. A method of registering images comprising:
    capturing a first original image of a scene under surveillance;

capturing a second original image of said scene under surveillance;

reducing said first and second original images to a preselected scale to form a reduced first original image and a reduced second original image having a common apparent size;

coarsely matching said first original image to said second original image to give approximate angle and offset parameters of said first original image to said second original image;

finely matching said first original image to said second original image based on the approximate angle and offset parameters of said coarsely matching step;

wherein said coarsely matching step further comprises:
   applying a plurality of rotations to the reduced first original image to form a rotated and reduced first original image; and
   performing a correlation match between the rotated and reduced first original image and the reduced second original image;

wherein said correlation match further comprises:
   transforming said rotated and reduced first original image and said reduced second original image into a Fourier domain by subjecting each to a Fourier transform to produce Fourier images including an array of spatial frequency coefficients;
   applying a complex conjugate transform to one of the Fourier images; and
   correlating the Fourier images by pixel multiplication in the Fourier domain to yield a product image;

applying an inverse Fourier transform to the product image to yield a correlation image having pixel values representing correlation coefficients corresponding to offsets given by row and column coordinates of a correlation coefficient pixel;

creating a set of peak correlation coefficients by collecting peak values from scanning each correlation image for a maximum pixel value;

identifying a rotational difference between the first and second original images by examining the set of peak correlation coefficients for a maximum correlation coefficient;

identifying an approximate shift offset between the first and second original images by determining row and column offsets corresponding to the rotational difference;

re-scaling said row and column offsets in size according to any reductions applied during said step of reducing said first and second original images;

reducing said first original image to form a second reduced first original image having a common scenic scale as said second original image so that scenic objects appearing in both images have a common extent; and rotating the second reduced first original image by the rotational difference to form a second rotated and reduced first original image;

wherein the finely matching step further comprises selecting a plurality of first offset patch images from the second rotated and reduced first original image from a grid of pre-selected locations uniformly and symmetrically spread around an extent of the second rotated and reduced first original image as modified by shifting according to the row and column offsets.

15. The method of claim 14 further comprising:
   checking each first offset image patch to ensure that each first offset image patch falls completely within the extent of the second rotated and reduced first original image.

16. The method of claim 15 further comprising adjusting a location of a first offset image patch falling outside the extent so that the first offset image patch falls just within the extent.

17. The method of claim 16 further comprising adjusting a location of a corresponding second offset image patch from the second original image according to said step of adjusting the location of the first offset image patch from the second rotated and reduced first original image.

18. The method of claim 17 further comprising re-selecting said first offset image patch from said second rotated and reduced first original image and said corresponding second offset image patch from said second original image if the corresponding second offset image patch falls outside of the extent so that both first and second offset image patches fall outside of their respective image extent by approximately the same amount.

19. The method of claim 14 further comprising selecting a plurality of second image patches from a grid of pre-selected locations uniformly and symmetrically spread around an extent of the second original image.

20. The method of claim 19 further comprising matching the first offset image patches with the second offset image patches by correlation such that each pair of corresponding patches produces one correlation image that is used to produce one control point for image registration.

21. The method of claim 20 wherein said correlation further comprises a Fourier transform.

22. The method of claim 20 further comprising locating the peak correlation value in each correlation image during correlation, the location of the peak correlation value giving the precise offset between the match point in the second original image and a corresponding match point in the second reduced and rotated first original image.

23. The method of claim 22 further comprising adding the precise offset determined during said correlation step and the row and column offset determined in the coarsely matching step to the location of the second offset image patch from the second original image to produce a measured location equivalent to a point in the second reduced and rotated first original image that corresponds with the match point in the second original image.

24. The method of claim 23 further comprising de-rotating and re-scaling the measured location by applying the reverse of the rotation and scaling that was applied to the reduced original image to yield a correct control point location in the first original image that matches a corresponding control point in the second original image.

25. The method of claim 24 wherein a set of all control point pairs gives a control set which is used to obtain a mathematical transformation that provides registration mapping between the first and second original images.

26. The method of claim 25 wherein the control set further comprises a set of pairs of corresponding measured and fiducial points in the first and second original images that define which points in the images coincide.

27. The method of claim 25 wherein the registration mapping further comprises a pair of mathematical functions that map coordinate locations in the first original image into the corresponding locations in the second original image.

28. The method of claim 27 wherein a statistical adjustment is used to produce a set of parameters that specify the mathematical functions.

29. The method of claim 25 further comprising obtaining a measure of remaining distance errors between control point pairs after registration mapping to indicate an accuracy of the registration mapping of the control point pairs in the control set.

30. The method of claim 29 further comprising inspecting the errors to determine if the registration mapping produces excessive error.

31. The method of claim 30 wherein said inspecting step further comprises:

computing a sequence of point coordinates corresponding to a geometric shape in the second original image;

transforming the sequence of point coordinates using the registration mapping into point coordinates in the first original image; and evaluating the transformed points to determine a closeness of fit of the sequence of point coordinates relative to the geometric shape in the second original image.

32. The method of claim 14 wherein said applying step further comprises rotating said reduced first original image by a sequence of angle increments that in combination encompass a range of possible rotational mismatches between the first original image and the second original image wherein sequential rotations increase from a minimum of the range by a pre-selected rotational increment.

33. The method of claim 32 wherein said pre-selected rotational increment further comprises two degree increments or less.

* * * * *